Nov. 27, 1934.                F. C. MOCK                1,981,874
                    INTERNAL COMBUSTION ENGINE
                        Filed Feb. 17, 1931
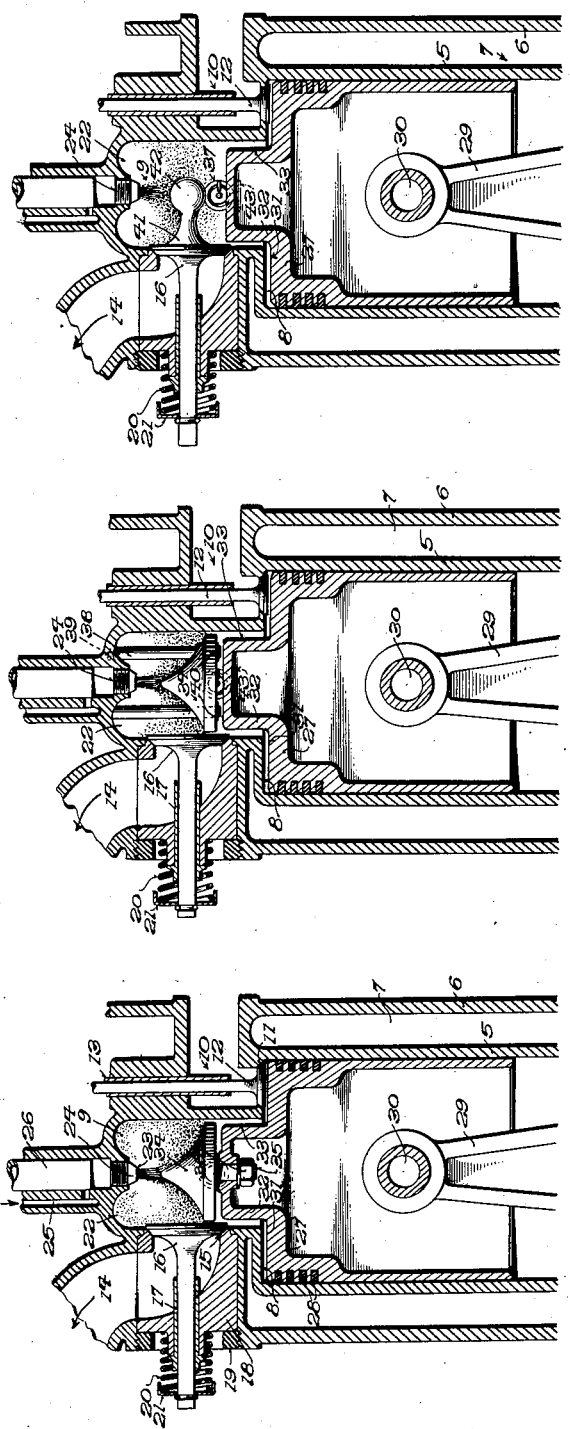
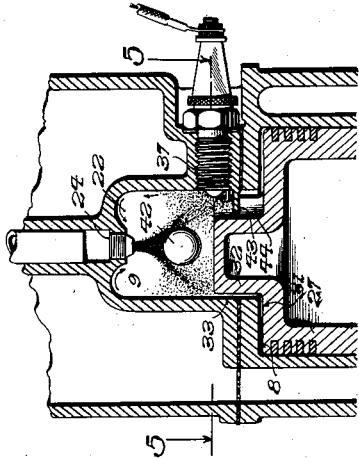
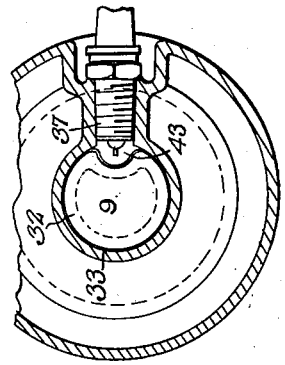
Inventor
Frank C. Mock.
F. B. Smith.
        Attorney Patented Nov. 27, 1934

1,981,874

UNITED STATES PATENT OFFICE

1,981,874

INTERNAL COMBUSTION ENGINE

Frank C. Mock, Montclair, N. J., assignor to Bendix Research Corporation, East Orange, N. J., a corporation of Indiana Application February 17, 1931, Serial No. 516,410

12 Claims. (Cl. 123—32)

This invention relates to internal combustion engines and more particularly to the injection of liquid fuel in such engines.

One of the objects of the present invention is to provide a novel method of injecting and diffusing a charge of fuel in an internal combustion engine.

Another object of the present invention is to provide a novel cylinder construction for an internal combustion engine.

Another object of the present invention is to provide a novel cylinder construction in an internal combustion engine, for improving the diffusion of fuel in the air charge and producing a high turbulence in the combustion chamber.

Another object of the present invention is to provide a novel cylinder construction in an internal combustion engine for improving ignition characteristics of a highly turbulent fuel charge.

Another object of the present invention is to provide a novel engine construction that is compact and simple and which increases the efficiency and power output of the engine.

These and other objects will be more apparent from the following description and drawing in which like reference characters denote like parts throughout the several views. It is to be expressly understood, however, that the drawing is for purpose of illustration only and does not define the limits of the invention; reference being had for this purpose to the appended claims.

In the drawing:

Fig. 1 is a vertical sectional view of an engine cylinder construction incorporating the novel features of the present invention.

Fig. 2 is a vertical sectional view of a modified engine cylinder construction similar to that shown in Fig. 1.

Fig. 3 is a vertical sectional view of an engine cylinder construction incorporating the novel features of the present invention in a modification different from either of the structures in Figs. 1 and 2.

Fig. 4 is a vertical sectional view of the modification of engine cylinder construction shown in Fig. 3 and is taken on line 4—4 of Fig. 3.

Fig. 5 is a sectional view taken along the line 5—5 of Fig. 4.

It has heretofore been proposed to increase the turbulence of the fuel charge in the combustion chamber of internal combustion engines, in order to more completely mix the air and fuel, but many difficulties have been encountered in the successful operation of such engines. One of the major difficulties presented when a liquid fuel is injected into a turbulent air stream in the combustion chamber, has been not only to properly diffuse the liquid fuel in the air but also to provide the mixture conditions and temperatures which will ensure ignition under the high velocity of moving air.

In the present invention the novel method of injecting the air and fuel obviates these difficulties to a considerable degree. This novel method consists first, in forcing a stream of compressed and thereby heated air into the combustion chamber at high velocity and of then deflecting the stream of air and reversing its direction to cause a swirling motion and a high velocity rotational flow within the combustion chamber. In the next step, liquid fuel is projected in an atomized condition against a highly heated surface where it received heat and from whence it comes off in smaller particles similar to a fog. In the final step, the atomized and heated stream of fuel fog is directed, by virtue of its initial velocity and the shape of the heating surface, into the aforementioned high velocity rotating air current, which causes very complete diffusion of the fuel and air molecules.

The ignition may then take place directly if the temperatures are sufficiently high; or indirectly from an igniting means such as an electric spark hot tube or glow plug, located preferably adjacent to the first path of fuel fog flow, but screened from the high air velocity.

A novel engine construction has been provided in the present invention for carrying out the above described method of injecting a fuel charge. In the form of construction shown in Fig. 1 a cylinder is provided having an inner wall 5 and an outer wall 6 closed at the ends to form a water jacket 7. The cylinder is stepped intermediate its length by an annular shoulder 8 to form a sub-cylinder 9. This sub-cylinder is preferably made concentric with the main cylinder and constitutes a combustion chamber.

A conduit 10 is provided in the cylinder wall which connects at one end with a source of air not shown, and terminates in a valve seat 11 in the annular shoulder 8, at the other end. A poppet valve 12 having a sliding fit in a bushing 13, positioned in a bore in the cylinder wall, cooperates with the valve seat 11 and controls the inlet of air to the cylinder. A second conduit 14 is provided in the cylinder wall, at the opposite side from the conduit 10, which terminates in a valve seat 15 in the side wall of the combustion chamber formed by the sub-cylinder 9. This conduit is for allowing exhaust of the burnt gases and is connected to the atmosphere or some suitable device such as a muffler. A poppet valve 16 is adapted to cooperate with the valve seat 15 for controlling the exhaust of the spent gas. The stem of this valve is mounted for longitudinal movement in a sleeve 17, positioned in a bushing 18 of highly refractory material to withstand the high temperatures to which it is subjected. This bushing is adapted to fit in a machined portion of the cylinder wall and it is held in position by a nut 19 having a threaded engagement with the cylinder wall construction. A spring 20 is adapted to cooperate with the bushing 18 and a collar 21 on the stem of the valve 16 for holding the valve in a normally closed position on the seat 11. Both the inlet and exhaust valves are adapted to be actuated by rotating mechanism of the engine (not shown).

The outer end of the sub-cylinder is closed by a wall or head formed as part of the cylinder construction. The interior of this head has an annular curved surface 22 terminating at a common center point 23 concentric with the axis of the sub-cylinder and forming an inverted cone. At this center point a nozzle 24 of a fuel injector is provided with the orifice constituting the apex of the inverted cone for purposes hereinafter described. A conduit 25 is formed in the cylinder head for admitting liquid fuel to the injector pump 26 in the direction as shown by the arrow.

A piston 27 is positioned within the cylinder and is provided with rings 28 for ensuring a tight fit with the interior of the cylinder wall 5. This piston is connected with a piston rod 29 by means of a wrist pin 30 as is well known to those skilled in the art. The working surface of the piston is stepped to correspond to the configuration of the cylinder and has an annular shoulder 31 corresponding with the annular shoulder 8 of the cylinder and a cylindrical boss 32 adapted to extend into the sub-cylinder, but providing an annular clearance ring 33 with the wall of the sub-cylinder. A cone-shape deflector 34 having a base of the same diameter as the cylindrical boss is mounted on the upper surface of the boss concentric with the axis of the piston, by means of a stud 35 extending through the piston and having a threaded connection with a nut 36.

An igniter 37 is positioned in the side wall of the sub-cylinder angularly spaced from both the intake and exhaust valves. This igniter may be in the form of a spark plug or glow plug depending upon the particular condition under which the engine is to operate.

The operation of the engine is as follows:

When the piston 27 moves downward in the charging stroke the valve 12 will be opened allowing a charge of air to be sucked into the cylinder filling the cylinder and combustion chamber. At the end of the downward stroke of the piston the valve 12 will close and the piston will commence its upward stroke compressing the air within the cylinder and combustion chamber. This compression will continue until the cylindrical boss 32 of the piston first begins to enter the sub-cylinder. At this time the air in the area between the annular shoulders 8 of the cylinder and 31 of the piston, will be forced through the annular orifice 33 formed by the extension 32 and the wall of the sub-cylinder. This annular orifice will act as a nozzle ring and direct the air into the combustion chamber in a stream or annular curtain at a very high velocity.

This curtain stream of air will strike the curved surface 22, in the head of the combustion chamber and be deflected downward and as a cylindrical air curtain with a quiescent center. At this time the fuel pump 26 will operate to inject a stream of liquid fuel through the region of quiescent air parallel to the surrounding curtain and against the cone shaped heating member 34, by which it is heated, and then deflected outwardly and into the stream or curtain of incoming air, causing a rotation of the stream of air and heated fuel in a toroidial direction. As will be readily apparent, a high turbulence will be created and maintained in the combustion chamber, causing an intimate contact of the fuel in the air. The deflector, being subjected to contact with the hot combustion gases, will absorb much of this high temperature heat and thereby continuously cause the liquid fuel to be fogged and vaporized as it is injected. The diffusion of the fuel is augmented by the turbulence and eddy currents in the air resulting from changing the direction of the fluid stream. This high turbulence with initial contact of the fuel on a heated surface insures a high degree of mixing and most favorable preparation for complete combustion of the entire charge. As the piston reaches its upper limit of travel ignition occurs and combustion of the charge, which upon expansion acts upon the total area of the piston during the power stroke of the engine.

The modification shown in Fig. 2 is similar to the construction shown in Fig. 1 but differs in that the cone-shape deflector 34 is held in the combustion chamber separate from the piston. In this construction the deflector 34 is held by means of rods 38 having a screw-threaded connection 39 with the head of the combustion chamber. These rods 36 at the other end extend through the deflector 34 and are provided with heads 40 forming a seat for the deflector. With this construction the path of the fluid stream is maintained constant at all times and does not vary with the position of the piston. The mode of operation is similar to that of the construction shown in Fig. 1 except for the difference in the cyclic path of the turbulent gases resulting from the stationary deflector.

In the preferred modification as shown in Figs. 3 and 4 the structure is similar to that shown in Figs. 1 and 2 but differing in the detailed arrangement of the elements. In this construction an extension 41 is made on the exhaust valve 16, which extends into the combustion chamber and terminates in a spherical deflector 42 positioned directly below the common center point of the inverted cone formed by the curve of the combustion chamber head. As will be readily apparent this spherical deflector receiving heat by conduction from the exhaust valve and also being in contact with the hot gases, will be heated to a high temperature and thus perform the functions both of heating the stream of atomized fuel and deflecting the same into the path of the incoming stream of air.

The position of the igniter and construction of the piston, which is common to all three of the modifications shown, is more clearly illustrated in Fig. 4 in which the igniter is shown in the form of a spark plug. To ensure the proper ignition of the fuel charge and to prevent any effect of the high turbulence within the combustion chamber from interfering with the proper ignition a baffle 43 is provided beneath the hot spot of the igniter preventing the stream of air entering the combustion chamber from directly striking the same. To provide for the positioning of this shield 43 in the side wall of the combustion chamber without interfering with the movement of the piston, the upper cylindrical boss 32 is formed with a cutaway portion 44 of the same shape as the shield 43. This view also shows that a part of the stream of fuel and air is directed by the cylindrical knob 42 directly onto the hot spot of the igniter to ensure proper ignition.

It will now be apparent that applicant's method provides for effectively injecting and diffusing a charge of fuel in an internal combustion engine and creating a high turbulence in the combustion chamber and that the cylinder construction will reduce the ignition difficulties of the highly turbulent fuel charge to a minimum. Also it is apparent that a novel engine construction has been provided that is compact and simple and in which the efficiency and power output of the engine will be increased.

It will be obvious that the invention is not limited to the specific forms described and illustrated in the drawing but is capable of a variety of embodiments. Various changes, which will now appear to those skilled in the art, may be made in the form and type of engine in which the present invention may be employed such as those incorporating the Diesel, semi-Diesel and Otto cycles without departing from the spirit of the invention, and reference is therefore to be had to the appended claims for a definition of the limits of the invention.

What is claimed is:

1. In an internal combustion engine, in combination, a cylinder, a piston, a combustion chamber at the head end of the cylinder, an exhaust valve in said combustion chamber adapted to form a heated wall thereof, means for introducing a charge of air into the cylinder, means for forcing the charge of air into the combustion chamber and past the valve in a stream at high velocity during the compression stroke of the engine, deflecting means in the combustion chamber for reversing the direction of the air stream, a fuel injector having a fuel opening parallel with the cylinder axis for introducing a fuel into the combustion chamber in the path of the air stream, and means in the chamber above the piston for heating and deflecting the stream of fuel toward the stream of incoming air to cause an intimate contact and diffusion of the fuel in the air.

2. In an internal combustion engine, in combination, a cylinder, a piston, a combustion chamber at the head end of the cylinder, an exhaust valve therein adapted to form a heated wall of the chamber, a head for the combustion chamber having an annular curved surface terminating in a point at the center of the chamber, means for introducing a charge of air into the cylinder, a piston so constructed and arranged as to force the charge of air past the exhaust valve into the combustion chamber in a circular curtain with a high velocity during the compression stroke of the engine, said air being deflected and reversed in its direction by the curved surface of the cylinder head, a fuel injector at the center point of the curved surface in the head having its orifice arranged parallel to piston travel for introducing fuel into the combustion chamber, means in the combustion chamber above the piston for heating and directing the air and fuel stream toward the circular curtain of air entering the combustion chamber, whereby an intimate contact and diffusion of the fuel in the air is produced, and an igniter located in the path of the air curtain.

3. In an internal combustion engine, in combination, a cylinder, a combustion chamber at the head end of the cylinder, an exhaust valve therein, a head for the combustion chamber having an annular curved surface, means for introducing a charge of air into the cylinder, a piston in the cylinder so constructed and arranged as to force the air past the exhaust valve into the combustion chamber at a high velocity which will be deflected and reversed by the curved surface of the chamber, a fuel injector having its orifice extending axially of the cylinder for introducing fuel into the stream of air, an igniter in the combustion chamber side wall, and means between the injector and piston for heating and directing a portion of the air and fuel stream toward the igniter.

4. In an internal combustion engine, in combination, a cylinder, a combustion chamber at the head end of the cylinder, a cylinder head for the combustion chamber having an annular curved surface forming an inverted cone, a cone-shaped heating and deflecting member suspended from the cylinder head and positioned within the combustion chamber directly below the inverted cone of the cylinder head, a piston within the cylinder so constructed and arranged as to introduce a circular stream of air into the combustion chamber, a fuel injector nozzle positioned in the cylinder head at the apex of the inverted cone for introducing a liquid fuel into the stream of air whereby the stream of air and fuel is deflected and caused to rotate by the curved surfaces of the head and cone-shaped member whereby a high turbulent combustible mixture is produced in the combustion chamber.

5. In an internal combustion engine, in combination, a cylinder, a combustion chamber at the head end of the cylinder, a cylinder head for the combustion chamber having an annular curved surface forming an inverted cone, an exhaust valve in the side wall of the combustion chamber having an extension in the form of a spherical knob directly below the apex of the inverted cone, a piston within the cylinder so constructed and arranged as to introduce a circular curtain of air into the combustion chamber, the stream being deflected and reversed in its direction by the curved surface of the head and deflected by the spherical extension of the exhaust valve to mix with the incoming stream, causing a high turbulence.

6. In an internal combustion engine, in combination, a cylinder, a combustion chamber at the head end of the cylinder, a cylinder head for the combustion chamber having an annular curved surface forming an inverted cone, a fuel injector nozzle positioned at the apex of the inverted cone, a piston within the cylinder so constructed and arranged as to force a circular stream of air into the combustion chamber at a high velocity which will be deflected and reversed in its direction by the annular curved surface of the cylinder head, and exhaust valve in the side wall of the combustion chamber having an extension in the form of a spherical knob positioned directly below the apex of the inverted cone, whereby the stream of fuel and air will be directed by the spherical extension toward the curtain of incoming air causing a high turbulence in the combustion chamber.

7. In an internal combustion engine, a cylinder, a combustion chamber at the head end of the cylinder, a cylinder head for the combustion chamber having an annular curved surface forming an inverted core, an exhaust valve in the side wall of the combustion chamber having an extension forming a fuel heating member beneath the cone, a piston within the cylinder so constructed and arranged as to introduce a circular curtain of air into the combustion chamber, the stream being deflected and reversed in its direction by the curved surface of the head and deflected by the extension of the exhaust valve to mix with the incoming air stream with a high turbulence.

8. In an internal combustion engine, a cylinder, a combustion chamber at the head end of the cylinder, a cylinder head for the combustion chamber having an annular curved surface forming an inverted cone, an exhaust valve in the side wall of the combustion chamber having an extension forming a fuel heating member beneath the cone, said extension including an enlarged terminal portion, a piston within the cylinder so constructed and arranged as to introduce a circular curtain of air into the combustion chamber, the stream being deflected and reversed in its direction by the curved surface of the head and deflected by the extension of the exhaust valve to mix with the incoming air stream with a high turbulence.

9. In an internal combustion engine, in combination, a cylinder, a combustion chamber at the head end of the cylinder, a cylinder head for the combustion chamber having an annular curved surface forming an inverted cone, a fuel injector nozzle positioned at the apex of the inverted cone, a piston within the cylinder so constructed and arranged as to force a circular stream of air into the combustion chamber at a high velocity which will be deflected and reversed in its direction by the annular curved surface of the cylinder head, and an exhaust valve in the side wall of the combustion chamber having an extension with an enlarged terminal portion positioned directly below the apex of the inverted cone, whereby the stream of fuel and air will be directed by the spherical extension toward the curtain of incoming air causing a high turbulence in the combustion chamber.

10. In an internal combustion engine, in combination, a cylinder having a piston therein, a combustion chamber in the cylinder above the piston, an exhaust valve in the chamber, a fuel injector in the chamber, said injector being arranged to forcibly direct substantially the entire fuel charge against the exhaust valve whereby heat is conveyed from the exhaust valve to the fuel during the operation of the engine.

11. In an internal combustion engine, in combination, a cylinder, a combustion chamber in the head end of the cylinder, an exhaust valve in said chamber, a fuel injector in said chamber, said injector being arranged to direct substantially the entire fuel charge against the exhaust valve for heating the fuel, means for creating air turbulence in the chamber adjacent the exhaust valve, said exhaust valve having its surface for receiving the impact of the fuel arranged to deflect the fuel into the turbulent air.

12. In an internal combustion engine, in combination, a cylinder, a combustion chamber in the head end of the cylinder, an exhaust valve in said chamber, a fuel injector in said chamber, said injector being arranged to direct substantially the entire fuel charge against the exhaust valve for heating the fuel, means on the piston for injecting a curtain of air into the chamber at high velocity past said exhaust valve, an igniter in said chamber, said igniter being arranged in the path of fuel deflected from said exhaust valve, and means for shielding said igniter from the high velocity air curtain.

FRANK C. MOCK.